Feb. 6, 1968          J. CHOLET ETAL          3,368,194
       MEANS FOR GENERATING ELECTRICAL DISCHARGES UNDER
             WATER FOR CONTINUOUS SEISMIC SOUNDINGS
                      Filed Dec. 13, 1966
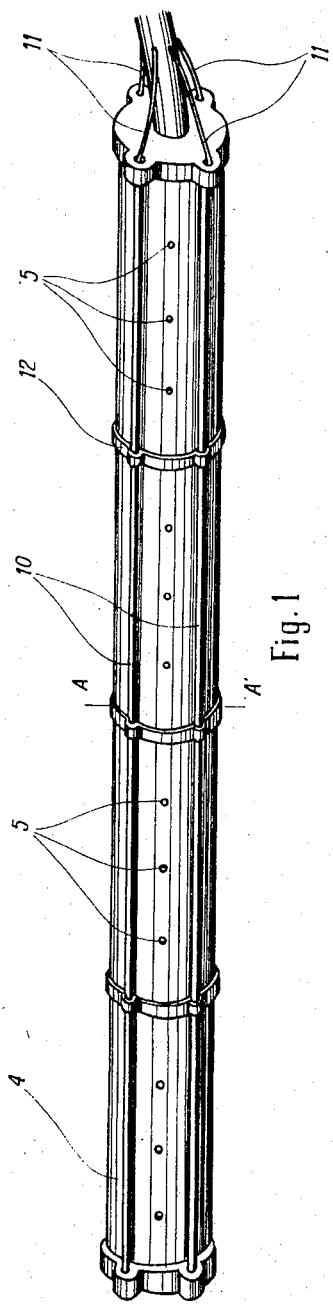
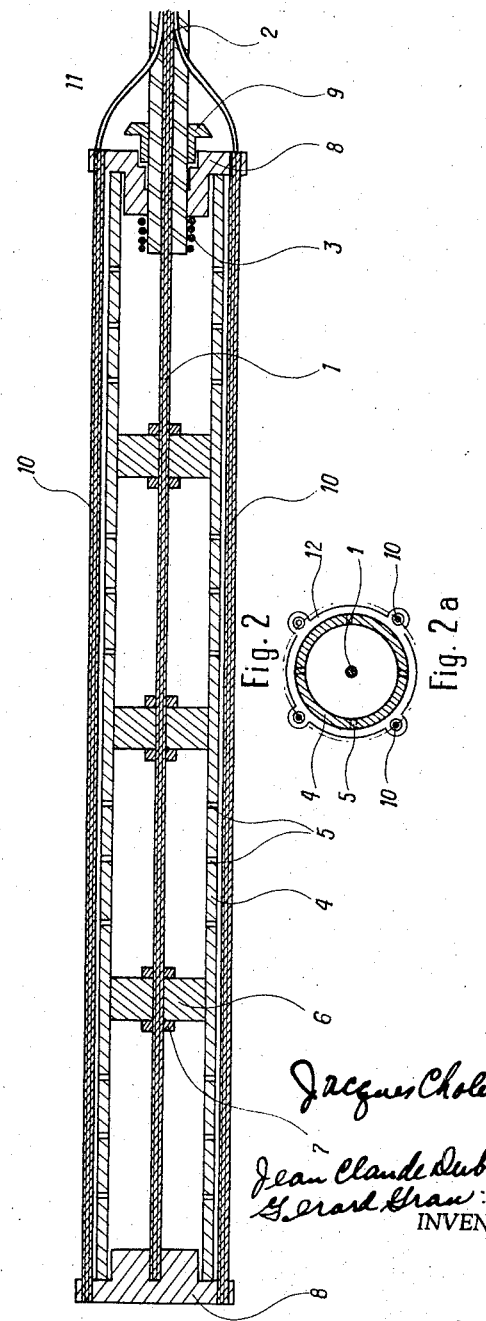

United States Patent Office 3,368,194
Patented Feb. 6, 1968

3,368,194
MEANS FOR GENERATING ELECTRICAL DISCHARGES UNDER WATER FOR CONTINUOUS SEISMIC SOUNDINGS
Jacques Cholet, Rueil Malmaison, Jean Claude Dubois, Royan, and Gérard Grau, Paris, France, assignors to Institut Francais du Petrole, des Carburants et Lubrifiants, Rueil-Malmaison, France
Filed Dec. 13, 1966, Ser. No. 601,372
Claims priority, application France, Dec. 18, 1965, 42,901
1 Claim. (Cl. 340—12)

ABSTRACT OF THE DISCLOSURE

The means used comprises a cylindrical sleeve of insulating material enclosing and spaced from a central electrode connected to a source of electrical pulses of high tension. The sleeve is provided with orifices and also at the exterior thereof is provided with a plurality of peripheral electrodes connected to the other terminal of the source of electrical pulses. The discharge takes place between the central electrode and the peripheral electrodes to set up pressure waves whereby underwater prospecting may be carried out in a continuous way.

---

One of the methods used for carrying out seismic soundings under water consists in producing pressure waves in the sea by means of submerged means for generating electrical discharges connected to a ship comprising for example electrodes fixed to a support that exceeds several centimeters and is branched in parallel, receiving electrical energy from a source of electrical pulses at high tension located upon the ship.

In a means for generating electrical discharges of this type the mounting of the electrodes when they are welded upon the main conductor can be sufficiently long if they are numerous.

The present invention has for an object a novel means for generating electrical discharges for carrying out continuous seismic soundings under water, having a great simplicity of mounting. The means for generating electrical discharges comprises a central electrode formed by a conductor connected to a terminal of a source of electrical pulses of high voltage, a cylindrical sleeve of insulating material, of greater diameter than that of the central electrode and pierced with orifices, encircling said electrode, a plug at each end of the sheath assuring tightness between the interior medium of said sheath and the exterior medium, peripheral electrodes substantially of the same length as the central electrode located at the exterior of the sheath in the longitudinal direction thereof, said peripheral electrodes being formed by conductors connected to the other terminal of the source of electrical pulses.

With the above and other objects in view which will become apparent from the detailed description below, some preferred modifications of the invention are shown in the drawings in which:

FIGURE 1 is a perspective view of the assembly of one constructional modification of the means for generating electrical discharges.

FIGURE 2 shows a longitudinal cross-ectional view of FIGURE 1, slightly modified.

FIGURE 2a shows a transverse cross-sectional view taken on section line A—A of FIGURE 1.

The means for generating electrical discharges as shown in the figures has a central electrode 1 formed for example by a flexible copper cable connected by the intermediary of another cable conductor 2 to a terminal of a source of electrical pulses of high voltage located upon a ship, not shown. The junction between the electrode 1 and the cable 2 is carried out by means of a fixation ring 3.

The electrode 1 is surrounded substantially throughout its entire length by a cylindrical sleeve 4 of insulating material of a diameter greater than that of the electrode 1 (for example between 30 mm. and 100 mm.) and pierced with orifices of a diameter, for example, in the neighborhood of 5/10 mm.

The electrode 1 is centered in the sleeve 4 by means of centering cylinders 6 of insulating material whose interior diameter is adjusted to the exterior diameter of the electrode 1 and the exterior diameter to the interior diameter of the sleeve 4. The cylinders 6 are maintained in position by the blocking bushings 7 positioned upon the electrode 1 and bearing against the central cylinders 6.

The ends of the electrode 1 are centered by means of insulating plugs 8 closing at the same time hermetically the ends of the sleeve 4. An axial passage is provided in one of the plugs 8 for the conductor 2 sheathed with insulating material, the tightness between the latter at the neighborhood of the plug 8 being assured by means of a press-packing 9.

The peripheral electrodes 10 forming earth-lead are placed at the exterior of the sleeve in the longitudinal direction thereof, their ends being maintained by their engagement in the passages adjusted to their diameter, provided in the portion of the plugs 8 external to the sleeve 4 and of a diameter greater than that of such sleeve. The electrodes 10 are formed for example by flexible copper cables connected to the other terminal of the source of electrical pulses by the intermediary of conducting cables 11.

The electrodes 10 are furthermore maintained in place upon the length of the sleeve 4 by means of rings 12. The length of the assembly can be between 2 meters and 100 meters according to the studies to be carried out.

When the discharge generating means are in operation the plugs 8 closing the ends of sleeve 4, the electrical circuit between the central electrode 1 and the peripheral electrodes 10 cannot be closed by the surrounding water body, except through the orifices 5 of the sleeve. In these orifices occurs a concentration of current lines resulting in the generation of a spark through each orifice, which spark in turn results in a pressure wave.

The mounting of such a means for generating electrical discharges is particularly simple and rapid. It is sufficient to use a tube of plastic material for example of current manufacture in which one threads the central electrode and its supports, the peripheral electrodes being not less easily placed and maintained very simply by means of the plugs 8 and the rings 12.

The means for generating electrical discharges according to the invention being immersed and connected to a travelling ship allows under water prospecting of geologic layers in a continuous way. Such a means for generating electrical discharges can have a length of several hundreds of meters and can be wound upon a winch.

The forms of construction shown upon FIGURES 1 and 2 differ slightly in that according to FIGURE 1 and FIGURE 3 the orifices 5 are located upon the sleeve in an interval between two adjacent peripheral electrodes while that according to the modification of FIGURE 2 the orifices are substantially in the plane containing the axis of the central electrode and the axis of a peripheral electrode.

From these two forms of construction that of the type illustrated in FIGURE 1 is preferred, experience having shown that it assures a better propagation of the pressure wave.

We claim:

1. A means for generating electrical discharges for effecting substantially continuous under water seismic soundings comprising a central electrode formed by a conductor connected to one terminal of a source of electrical pulses, a cylindrical sleeve of insulating material having a greater diameter than that of said central electrode and pierced with orifices which encircle said electrode, a plug at each end of said sleeve assuring electrical insulation between the interior medium thereof and the exterior medium, peripheral electrodes substantially of the same length as said central electrode located at the exterior of said sleeve in a longitudinal direction thereof, said peripheral electrodes being formed by conductors connected to the other terminal of said source of electrical pulses.

No references cited.

BENJAMIN A. BORCHELT, *Primary Examiner.*

W. KUJAWA, *Assistant Examiner.*